Patented Sept. 7, 1943

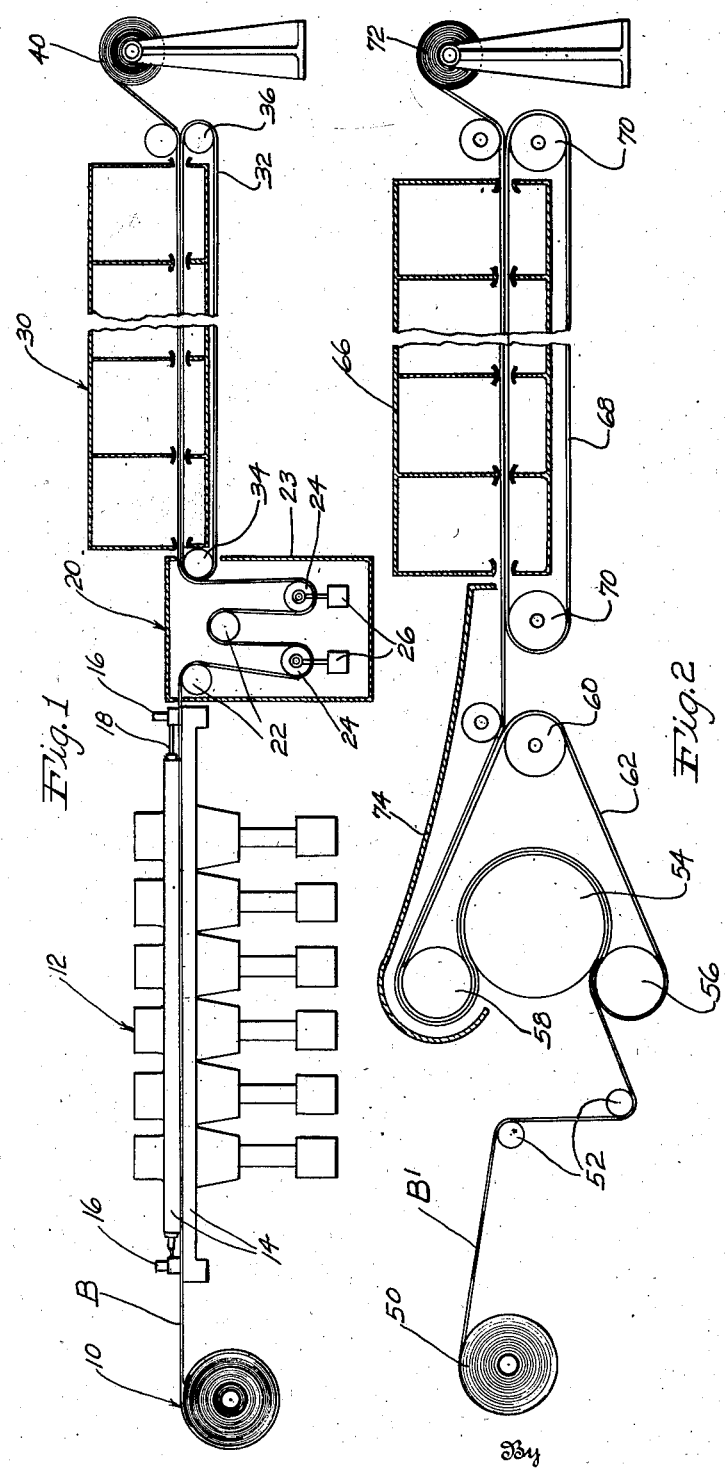

2,328,909

UNITED STATES PATENT OFFICE 2,328,909

METHOD AND APPARATUS FOR VULCANIZING BELTS AND THE LIKE

Karl B. Kilborn, Akron, Ohio, assignor to Wingfoot Corporation, Akron, Ohio, a corporation of Delaware Application September 18, 1941, Serial No. 411,346

9 Claims. (Cl. 18—6)

This invention relates to methods and apparatus for vulcanizing rubber sheet material with or without fabric or other reinforcing means therein, and, more particularly, is concerned with improved methods and apparatus for vulcanizing conveyor belts, transmission belts, corrugated matting, flooring, rubber sheets, printers' blankets, and similar material.

Heretofore, it has been the standard practice to vulcanize long conveyor belts in a stationary platen press with the press being used to vulcanize a portion of the length of the belt, the belt after vulcanization being advanced through the press so that another portion of the length of the belt can be vulcanized. This procedure is slow and necessitates the tying up of the relatively expensive platen press for long intervals during the manufacture of a relatively small quantity of belting. Further, it has been suggested heretofore that long lengths of rubber sheet material, such as belting, be vulcanized on a continuously rotated heated drum with the rubber sheet or belt being held against the surface of the drum by a pressure band. Apparatus of this type, also, is relatively expensive and the heated drum must be revolved at a very slow rate to effect the complete vulcanization of the rubber material.

It has been proposed, also, to vulcanize rubber pneumatic tires by semi-curing the tires in standard metal molds, and, thereafter, removing the tires from the molds and completing the cure by hanging the tires in a steam pot or heater where they are subjected to considerable pressure by the steam. Thus, this process does not adapt itself to the progressive and continuous vulcanization of long lengths of belting for the reason that the belt is usually of such length that it cannot be contained in a steam heater unless it is wound into a roll and the whole roll vulcanized and this is ordinarily undesirable. In any event, continuous processes for partially vulcanizing and thereafter completely vulcanizing belting and other elongated rubber sheet material have never been proposed or accepted commercially, so far as I am aware.

It is the general object of my invention to avoid and overcome the foregoing and other disadvantages of and objections to known methods and apparatus for vulcanizing belting and other rubber sheet material by the provision of improved methods and apparatus adapted to vulcanize belting progressively and continuously in a rapid and efficient manner and with a minimum of overhead cost.

Another object of my invention is to provide an improved method for vulcanizing rubber sheet material and wherein a long length of the material is continuously passed in a vulcanizing path with the material being semi-cured in a platen press or on a rotary drum and with the cure being completed in superheated steam or hot air or other fluid or mixture thereof at substantially atmospheric pressure and while moving continuously.

Another object of my invention is the provision of vulcanizing apparatus for vulcanizing long lengths of belting and the like and wherein known belt-curing apparatus performs a semi-cure, and means progressively and continuously convey the semi-cured belting through an oven containing heated fluid under substantially no pressure but atmospheric to complete the vulcanization.

Another object of my invention is the provision of a method for curing belting and the like and wherein the belting is semi-cured in progressively stepped portions and while at rest, stored after semi-curing and then continuously passed from the storage and cold or while still retaining the heat of the semi-cure through a final vulcanizing path where it is subjected to heat only.

The foregoing and other objects of my invention are achieved by the provision of a method for vulcanizing belting and the like which comprises passing the belting from a let-off station through a vulcanizing path to a wind-up station, semi-vulcanizing the belt with the application of heat and mechanical molding pressure during the first part of the vulcanizing path, and continuously passing the belting through the last part of the vulcanizing path while applying vulcanizing heat only to the belting but in sufficient amounts and for a length of time to complete the vulcanization, and winding up the vulcanized belt.

The improved apparatus of my invention comprises means for passing the belting in a vulcanizing path, means for applying heat and mechanical molding pressure to the belt in the first part of the path to effect a semi-cure, means for moving the belting continuously through the last part of the vulcanizing path, and means for completing the cure by applying heat without pressure to the continuously moving portion of the belting while the heat from the semi-cure is still retained therein.

For a better understanding of my invention reference should be had to the accompanying drawing wherein Fig. 1 diagrammatically illustrates in side elevation, with certain parts being broken away, one typical apparatus of my invention and adapted to perform the method thereof; and Fig. 2 is a view similar to Fig. 1 but illustrating a modified form of apparatus and a modified manner of practicing my invention.

Although my invention is broadly adapted for use in the vulcanization of substantially any elongated sheet material, and particularly rubber or rubber reinforced sheet material, as for example printers' blankets, flooring, corrugated rubber matting, conveyor and transmission belting, and the like, nevertheless, it is primarily concerned with vulcanizing various types of rubber belting reinforced by fabric or other means, and, therefore, has been so illustrated and will be so described.

In the drawing, the numeral 10 indicates a let-off mechanism carrying a roll of belting B which is in the green or unvulcanized state and the several convolutions of which may be separated by the usual liner (not shown). The belt B extending from the let-off mechanism passes through a large stationary press, indicated as a whole by the numeral 12, and including relatively movable platens 14 which are adapted to be pressed by relatively high pressure on opposite sides of the belt in accordance with well known apparatus and procedure.

The press 12 ordinarily includes clamps 16 which are adapted to grip the ends of the belt B and stretching mechanism 18 whereby the belting carried by the clamps 16 can be given any desired degree of longitudinal stretch before the platens 14 of the press are engaged with the belt. The platens of the press are heated with steam or other suitable means and are held in engagement with the belt a sufficient length of time to effect a semi- or partial cure of the belt. The semi-cure given the belt by the press 12 is of such character that the belt is substantially "set" after the belt is removed from the press. In other words, there is substantially no deforming or change of shape in the belt after the semi-cure, and the tension imparted to the belt by the stretching means 18 is largely retained in the belt.

From the platen press 12 the belt B extends to a festooning device, indicated as a whole by the numeral 20, and including a heat insulating cover 23 for retaining heat in the semi-cured belt, and a plurality of rolls 22 over which the belt passes. Other rolls 24 are received in suitable downwardly extending loop portions of the belt, and rolls 24 may be weighted, as at 26, so that the festooning device functions to store up a desired length of the belt for the final curing operation now to be described.

From the festooning device 20, the belt B passes through a relatively long chamber or oven 30 which is filled with heated fluid substantially at atmospheric pressure. I contemplate the use of superheated, atmospheric-pressure steam which may be fed to the oven 30 in any suitable manner, or I may employ circulated hot air, circulated hot air and steam vapor, or other heated fluid. An endless conveyor 32 extending over head and tail pulleys 34 and 36, is positioned in the oven 30 to pick up the belt B and conduct it through the oven. After leaving the oven 30 the belt B passes to any suitable wind-up mechanism 40.

It will be evident from the foregoing description that in the operation of the apparatus the belt B is given a semi-cure at longitudinally stepped portions of the belt by the platen press 12 and while the belt is at rest in the press. The festooning device 20 stores, substantially without loss of heat, the necessary length of belt so that the belt can be moved continuously through the oven 30 and wound up continuously by the wind-up mechanism 40. The speed of the belt through oven 30 is never so great but that an ample supply of belt is carried by the festooning device at all times, and the supply in the festooning device is periodically replaced by the feeding of semi-cured belt portions from the platen press.

In the modification of my invention illustrated in Fig. 2 of the drawing the numeral 50 indicates a let-off mechanism from which the belt B' passes over rolls 52 to the surface of a heated drum 54 which is continuously rotated by suitable means (not shown). Associated with the drum 54 are rolls 56, 58 and 60 carrying a pressure band 62 which engages with the outer surface of the belt B' and forces the belt against the surface of the heated drum with a relatively high molding pressure. The surface of the drum may be formed with suitable molding means which produce ribs, corrugations or other desired configurations on the belt B'. After leaving the surface heated drum 54 the belt B' passes to a chamber or oven 66 which includes a conveyor 68 carried by head and tail pulleys 70. The belt B' is conveyed through the oven 66 and is wound up on a suitable wind-up mechanism 72. A cover or heat shield 74 is preferably positioned around the travel of the belt B' from the semi-cure apparatus to the final cure apparatus so that substantially all the heat from the semi-cure is retained in the belt when it reaches the final cure oven.

The operation of this form of my invention is generally similar to that of Fig. 1. However, in the embodiment of my invention illustrated in Fig. 2 the belt B' passes continuously from the let-off mechanism 50 over the heated drum 54, through the final cure oven 66, and is wound continuously on the wind-up mechanism 72. The belt B' may be given any necessary semi-cure by the drum 54 to effect a "set" thereof, and as above described, the final cure given the belt by the oven 66 is of any necessary length to complete the vulcanization of the belt.

The belt B' being vulcanized by the apparatus shown in Fig. 2 in accordance with the method thereof may be tensioned during the semi-curing of the belt in any desired way. This conveniently is accomplished by braking the let-off mechanism 50 to any necessary degree so that the requisite tension is put into the belt by the pulling action effected by the rotary drum 54 against which the belt B' is compressed by the pressure band 62. Further, I contemplate maintaining any desired tension on the belt during its passage through the final cure oven 66, as for example, a tension approaching that applied to the belt during the semi-cure. This tension may be applied by driving the wind-up 72 through a suitable adjustable clutch (not shown). Similarly I may tension the belt of Fig. 1 by increasing the weights 26 and driving the wind-up 40.

I have found that in accordance with my improved method and apparatus that I am able to greatly increase the production capacity of the relatively expensive platen press 12 of Fig. 1, and the relatively expensive rotary drum apparatus shown in Fig. 2. Specifically, the time that the belt requires for semi-curing is only a fraction of the time required for complete curing of the belt. It will be appreciated that the vulcanizing time of any rubber sheet material may vary considerably in accordance with the actual rubber stock, the vulcanizers and accelerators employed, the thickness of the stock or sheet material, and the vulcanizing temperature. However, as a typical example of the operation of my improved process upon a standard conveyor belt which took 30 minutes to vulcanize to full cure in a standard platen press or rotary drum apparatus, the same belt was semi-cured in the platen press 12 of Fig.

1 in approximately 10 minutes, and the vulcanization of the belt was completed by passing through the relatively inexpensive oven 30 wherein each portion of the belt was subjected to approximately 60 minutes final cure at a temperature of about 250° F. Another portion of the same length of belt was semi-cured on the rotary drum 54 of Fig. 1 in approximately 10 minutes and the cure was completed in the oven 66 in approximately 50 minutes at a temperature of 295° F.

From the foregoing it will be recognized that the objects of my invention have been achieved by the provision of improved methods and apparatus for continuously vulcanizing rubber sheet material. The overhead cost of the vulcanizing apparatus for unit length of rubber sheet material vulcanized is very considerably reduced, and production on each platen press and heated drum apparatus is considerably speeded up. The ovens 30 and 66 are relatively inexpensive and because of the use of heating fluid at substantially atmospheric pressure the belts or other rubber sheet material can be readily and continuously passed to and through the ovens. The apparatus and method are easily operated and performed and can readily be used to vulcanize substantially any rubber sheet material, and are capable of forming the surface thereof smooth or with suitable and desired configuration.

The words "belt," "belts," or "belting" as employed in the specification and claims are intended to include any sheet material of rubber or other thermo-set plastic and reinforced with fabric or other means.

While in accordance with the patent statutes I have specifically illustrated and described at least one embodiment of my invention, it should be particularly understood that I am not to be limited thereto or thereby, but that the scope of my invention is defined in the appended claims.

I claim:

1. That method of vulcanizing belting, and the like, which comprises passing the belting from a let-off station through a vulcanizing path to a wind-up station, partially vulcanizing the belting with the application of heat and mechanical molding pressure and while under considerable longitudinal tension during the first part of the vulcanizing path, and continuously passing the belting still under tension through the last part of the vulcanizing path with the application of superheated steam at atmospheric pressure to the belting but in sufficient amounts and for a length of time to complete the vulcanization, and winding up the vulcanized belting.

2. That method of vulcanizing belting, and the like, which comprises passing the belting from a let-off station through a vulcanizing path to a wind-up station, partially vulcanizing the belting with the application of heat and mechanical molding pressure during the first part of the vulcanizing path, and continuously passing the belting through the last part of the vulcanizing path with the application of vulcanizing heat only to the belting but in sufficient amounts and for a length of time to complete the vulcanization, and winding up the vulcanized belting.

3. That method of vulcanizing belting, and the like, which comprises continuously passing the belting from a let-off station through a vulcanizing path to a wind-up station, partially vulcanizing the belting by the progressive application of heat and mechanical molding pressure in the first part of the vulcanizing path, continuously and progressively completing the vulcanization of the belting during the remainder of its travel through the vulcanizing path and by the application of superheated steam substantially at atmospheric pressure to the belting, and continuously winding up the belting after vulcanization.

4. The method of vulcanizing belting, and the like, which comprises continuously passing the belting through an arcuate path, subjecting the belting to the action of heat and molding pressure during its travel through the arcuate path, continuously passing the belting from the arcuate path and substantially without loss of heat to and through a final vulcanizing path, and subjecting the belting to contact with heated fluid during the travel of the belting through the final vulcanizing path.

5. That method of vulcanizing belting, and the like, comprising passing the belting through a vulcanizing path, stopping a portion of the belting near the start of the path, semi-curing the stopped portion of the belting by the application of heat and mechanical molding pressure and while under longitudinal tension, festooning a part of the portion of the belting previously semi-cured, continuously passing the belting from the festooned supply through the remainder of the vulcanizing path, and subjecting at least part of the continuously moving portion of the belting to superheated steam at atmospheric pressure to complete the cure.

6. That method of effecting the continuous vulcanization of a long length of belting which includes the steps of semi-curing stepped portions of the belting while at rest, progressively completing the cure of the belt while it is continuously moved, and festooning portions of the belting between semi-curing and final curing.

7. Apparatus for vulcanizing long lengths of belting or the like and comprising means for passing the belting in a vulcanizing path, means for applying heat and mechanical molding pressure to the belting at the first part of the path to effect a semi-cure, means for moving the belting continuously through the last part of the vulcanizing path, and means for completing the cure by applying heat without pressure to the continuously moving portion of the belt while the heat from the semi-cure is still retained therein.

8. Apparatus for curing belts, and the like, and including a continuously rotated heated drum, means for continuously passing the belt over the drum, to effect a semi-cure, means for holding the belt against the drum with molding pressure, a final cure oven containing hot fluid and directly associated with the drum and receiving the belt therefrom, means for continuously passing the belt through the oven, and means for winding up the belt.

9. In combination, a let-off mechanism, a flat platen press for curing belts and the like, and positioned to receive a belt from the let-off mechanism, a festooning device positioned to receive and store the belt coming from the press substantially without loss of temperature, an oven filled with hot fluid under substantially no pressure and positioned to receive the belt from the festooning device, and means for continuously moving the belt through the oven.

KARL B. KILBORN.